United States Patent
Gupta et al.

(10) Patent No.: US 12,307,072 B2
(45) Date of Patent: May 20, 2025

(54) SYSTEM AND METHOD OF RENDERING USER INTERFACE COMPONENTS BASED ON PRIORITY

(71) Applicant: Microsoft Technology Licensing, LLC, Redmond, WA (US)

(72) Inventors: Rahul Gupta, Bangalore (IN); Jiten Singh Sadhwani, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/156,664

(22) Filed: Jan. 19, 2023

(65) Prior Publication Data

US 2024/0086034 A1    Mar. 14, 2024

Related U.S. Application Data

(60) Provisional application No. 63/406,589, filed on Sep. 14, 2022.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0484* (2013.01); *G06F 40/143* (2020.01)

(58) Field of Classification Search
CPC ..... G06F 3/0482; G06F 40/143; G06F 3/0484
See application file for complete search history.

(56) References Cited

U.S. PATENT DOCUMENTS

| 7,765,295 | B2 | 7/2010 | Anastas et al. |
| 8,314,809 | B1 * | 11/2012 | Grabowski ......... G06F 16/9577 |
| | | | 345/545 |

(Continued)

FOREIGN PATENT DOCUMENTS

| CN | 110198324 B | 12/2021 |
| WO | 2021154410 A1 | 8/2021 |

OTHER PUBLICATIONS

"Critical rendering path", Retrieved From: https://developer.mozilla.org/en-US/docs/Web/Performance/Critical_rendering_path, Oct. 6, 2022, 5 Pages.

(Continued)

*Primary Examiner* — David Phantana-angkool
(74) *Attorney, Agent, or Firm* — NovoTechIP International PLLC (57) ABSTRACT

A system and method for rendering a plurality of user interface (UI) components of a UI screen based on a priority order is conducted by receiving a request to load the UI screen, each component of the UI screen being associated with a priority order, creating a data structure for rendering the UI components in accordance with the priority order, the data structure including a list of the UI components in an order in which they should be rendered, generating an event for rendering a first UI component in the data structure, receiving an indication that the first UI component has been rendered, responsive to receiving the indication that the first UI component has been rendered, moving to a next UI component in the list to render and continuing with the rendering of the UI components in accordance with the list until all UI components in the list have been rendered.

20 Claims, 6 Drawing Sheets

(51) Int. Cl.
*G06F 3/0484* (2022.01)
*G06F 40/143* (2020.01)

(56) References Cited

U.S. PATENT DOCUMENTS

| | | | | |
|---|---|---|---|---|
| 9,195,362 | B2* | 11/2015 | Lewin | G06F 3/0481 |
| 9,218,105 | B2* | 12/2015 | Månsson | G06F 3/04847 |
| 9,535,575 | B1* | 1/2017 | Labaj | G06F 16/11 |
| 9,678,928 | B1 | 6/2017 | Tung | |
| 9,852,114 | B2* | 12/2017 | Wang | G06F 40/106 |
| 10,827,021 | B2* | 11/2020 | Wei | G06F 16/00 |
| 11,023,098 | B2* | 6/2021 | Mak | G06F 3/0485 |
| 11,030,392 | B2* | 6/2021 | Zhou | G06F 40/154 |
| 11,138,288 | B2* | 10/2021 | Ruan | H04L 67/01 |
| 11,157,156 | B2* | 10/2021 | Ruan | G06F 40/106 |
| 2010/0281402 | A1 | 11/2010 | Staikos et al. | |
| 2011/0010615 | A1 | 1/2011 | Dees et al. | |
| 2012/0124518 | A1* | 5/2012 | Stawitz | G06F 9/45512 |
| | | | | 715/810 |
| 2013/0007590 | A1 | 3/2013 | Rivera et al. | |
| 2015/0088970 | A1 | 3/2015 | Wei et al. | |
| 2015/0363481 | A1* | 12/2015 | Haynes | G06Q 10/10 |
| | | | | 707/748 |
| 2020/0110528 | A1 | 4/2020 | Mak | |
| 2021/0034692 | A1* | 2/2021 | Ruan | G06F 16/9577 |
| 2021/0342785 | A1* | 11/2021 | Mann | G06Q 10/06313 |
| 2024/0086034 | A1* | 3/2024 | Gupta | G06F 3/0482 |

OTHER PUBLICATIONS

"Min-max heap", Retrieved From: https://en.wikipedia.org/wiki/Min-max_heap, Nov. 2, 2022, 8 Pages.

Grigorik, Ilya, "Render-tree Construction, Layout, and Paint", Retrieved From: https://web.dev/critical-rendering-path-render-tree-construction/, Mar. 31, 2014, 7 Pages.

Sohoni, et al., "Optimizing resource loading with Priority Hints", Retrieved From: https://web.dev/priority-hints/, Oct. 20, 2021, 20 Pages.

"Detecting when React Components are Visually Rendered as Pixels", Retrieved From: https://www.webperf.tips/tip/react-hook-paint/, Feb. 6, 2022, 10 Pages.

"Detecting when the Browser Paints Frames in JavaScript", Retrieved From: https://www.webperf.tips/tip/measuring-paint-time/, Feb. 6, 2022, 11 Pages.

International Search Report and Written Opinion received for PCT Application No. PCT/US2023/030745, Nov. 15, 2023, 13 pages.

International Preliminary Report on Patentability received for PCT Application No. PCT/US23/030745, Mar. 27, 2025, 08 pages.

* cited by examiner

SYSTEM AND METHOD OF RENDERING USER INTERFACE COMPONENTS BASED ON PRIORITY

BACKGROUND

Many user interface (U) screens depicted in various applications include elements that represent different components in the UI screen. To display and render the UI screen, often the various elements have to be processed. The elements are often processed in the sequence in which they appear on the render tree or document object model (DOM) tree for the UI screen. As a result, a component that appears higher in the render or DOM tree is processed before a component that appears later in the render or DOM tree. Processing of these components sometimes requires the application to perform synchronous, complex and time-taking operations that block the main thread and as such result in a delay in processing components that are further below in the render tree. This often causes delay in the processing of the components that appear later in the render/DOM tree. However, components appearing towards the bottom of the render/DOM tree may be more relevant to the end user than the components that appear at the top of the render/DOM tree. Yet, the later appearing components are processed and rendered later. This may result in the most relevant or useful components being displayed after less important or relevant components. The delay in rendering the most relevant and useful components leads to a perception of slowness to the end user.

Hence, there is a need for improved systems and methods of rendering UI components.

SUMMARY

In one general aspect, the instant disclosure presents a data processing system having a processor and a memory in communication with the processor wherein the memory stores executable instructions, that when executed by the processor, cause the data processing system to perform multiple functions. The functions include receiving a request to load the UI screen, each component of the UI screen being associated with a priority order, creating a data structure for rendering the UI components in accordance with the priority order, the data structure including a list of the UI components in an order in which they should be rendered, generating an event for rendering a first UI component in the data structure, receiving an indication that the first UI component has been rendered, responsive to receiving the indication that the first UI component has been rendered, moving to a next UI component in the list to render and continuing with the rendering of the UI components in accordance with the list until all UI components in the list have been rendered in accordance with the priority order.

In yet another general aspect, the instant disclosure presents a method for rendering a plurality of user interface (UI) components of a UI screen based on a priority order. In some implementations, the method includes receiving a request to load the UI screen, each component of the UI screen being associated with a priority order, creating a data structure for rendering the UI components in accordance with the priority order, the data structure including a list of the UI components in an order in which they should be rendered, generating an event for rendering a first UI component in the data structure, receiving an indication that the first UI component has been rendered, responsive to receiving the indication that the first UI component has been rendered, moving to a next UI component in the list to render and continuing with the rendering of the UI components in accordance with the list until all UI components in the list have been rendered.

In a further general aspect, the instant disclosure presents a non-transitory computer readable medium on which are stored instructions that, when executed, cause a programmable device to perform multiple functions. The functions include receiving a request to load the UI screen, each component of the UI screen being associated with a priority order, assigning queue positions to each component of the plurality of components in a render queue for rendering the plurality of components, the render positions being based at least in part on the priority order; creating a data structure for rendering the UI components in accordance with the render queue, the data structure including a list of the UI components in an order in which they appear in the render queue, generating an event for rendering a first UI component in the data structure, receiving an indication that the first UI component has been rendered, responsive to receiving the indication that the first UI component has been rendered, moving to a next UI component in the list to render and continuing with the rendering of the UI components in accordance with the list until all UI components in the list have been rendered. The priority order may be determined by the developer or maintainer of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

A request for loading a web page and/or application page often starts with a Hypertext Markup Language (HTML) request. In response to the request, the server returns the HTML which includes response headers and data. The browser or application then begins parsing the HTML and converting the received data to a document object model (DOM) tree. To create the DOM tree, the browser or application processes the HTML and important assets when needed. Once an imported asset is returned, the browser or application continues to parse the HTML, initiate requests, when needed, and build the DOM, until it arrives at the end of the HTML. At this point, a Cascading Style Sheets (CSS) object model is created. Once the DOM and CSS object model are complete, the browser or application builds the render tree and computes the styles (e.g., width and height of boxes) for the visible content. After the render tree is complete, layout occurs, defining the location and size of the render tree elements. Once this step is complete, the page is rendered on the screen.

Webpages and software applications include many components that represent different component on the UI screen of the webpage or software application. These components may include headers, footers, tables, lists and the like. Currently, the components on the UI screen are processed and rendered in the sequence they appear in the render tree. Furthermore, the activities surrounding the processing of components are executed on the main thread. Some of these activities such as rendering a component or processing synchronous instructions in the component are blocking requests on the main thread. This means that processing the next component begins after the instructions for the current component are complete. This results in a delay in the processing and rendering of components that appear later in the render tree. However, there are instances when the more important or relevant components appear towards the bottom of the render tree. This results in a delay in the processing and rendering of the more important components, and often leads to a perception of slow rendering of the page for the end user or a perception that important components that the user is interested in are rendered later. However, currently, there are no mechanisms for rendering components on a UI screen based on an order of their importance. Thus, there exists a technical problem of unnecessary delay in the rendering of high priority components in UI screens.

To address these technical problems and more, in an example, this description provides technical solutions for assigning a priority order to components of a UI screen and processing the components based on the priority order such that components are rendered in a preferred order. The order of priority of each component may be assigned by a developer/creator of the UI screen. The technical solution utilizes a centralized render management service to keep track of the process status of each component. The render management service receives data about events related to screen components and invokes events based on the status of an internal data structure maintained by the service. This is achieved by utilizing an event management service that keeps track of the components on the UI screen, the priority assigned to each component, and the current processing status of the component. Once the code for the UI screen is received, the components on the UI screen may be subscribed to the event management service to enable tracking. Once the components of the UI screen are processed and loaded, they are rendered based on their order of priority. As such, while components of a higher priority are loaded, the lower priority components are deferred/delayed. The lower priority component may be displayed using a placeholder. The placeholder may be a skeleton placeholder, shimmer, loader and the like. Once the high priority component is rendered, the rendered component transmits an event to the render management service which initiates the rendering of the next component in the priority order. In this manner, the technical solution provides an easy-to-use mechanism for prioritizing the rendering of UI screen components. This ensures that more important or relevant UI screen components are processed and rendered before lower priority components. As such, the technical solution significantly improves the UI screen rendering speed of prioritized components and their appearance and thus increases user satisfaction.

The technical solution described herein addresses the technical problem of delay in rendering of important UI components. The technical solution takes the priority of UI components into account when rendering. In this manner, UI components that are more important or relevant can be rendered before less important UI components. Furthermore, delay caused by blocking requests is less likely to affect more important UI components. These techniques reduce the perception of slowness for the end user and as such increase user satisfaction. The technical effects include reducing the amount of time required to render important UI.

As will be understood by persons of skill in the art upon reading this disclosure, benefits and advantages provided by such implementations can include, but are not limited to, a technical solution to the technical problems of inefficient rendering of important UI components in UI screens such as webpages and application pages. Technical solutions and implementations provided herein offer a mechanism for rendering UI components based on a priority order. The benefits made available by these technology-based solutions provide increased user satisfaction.

Figure 1:
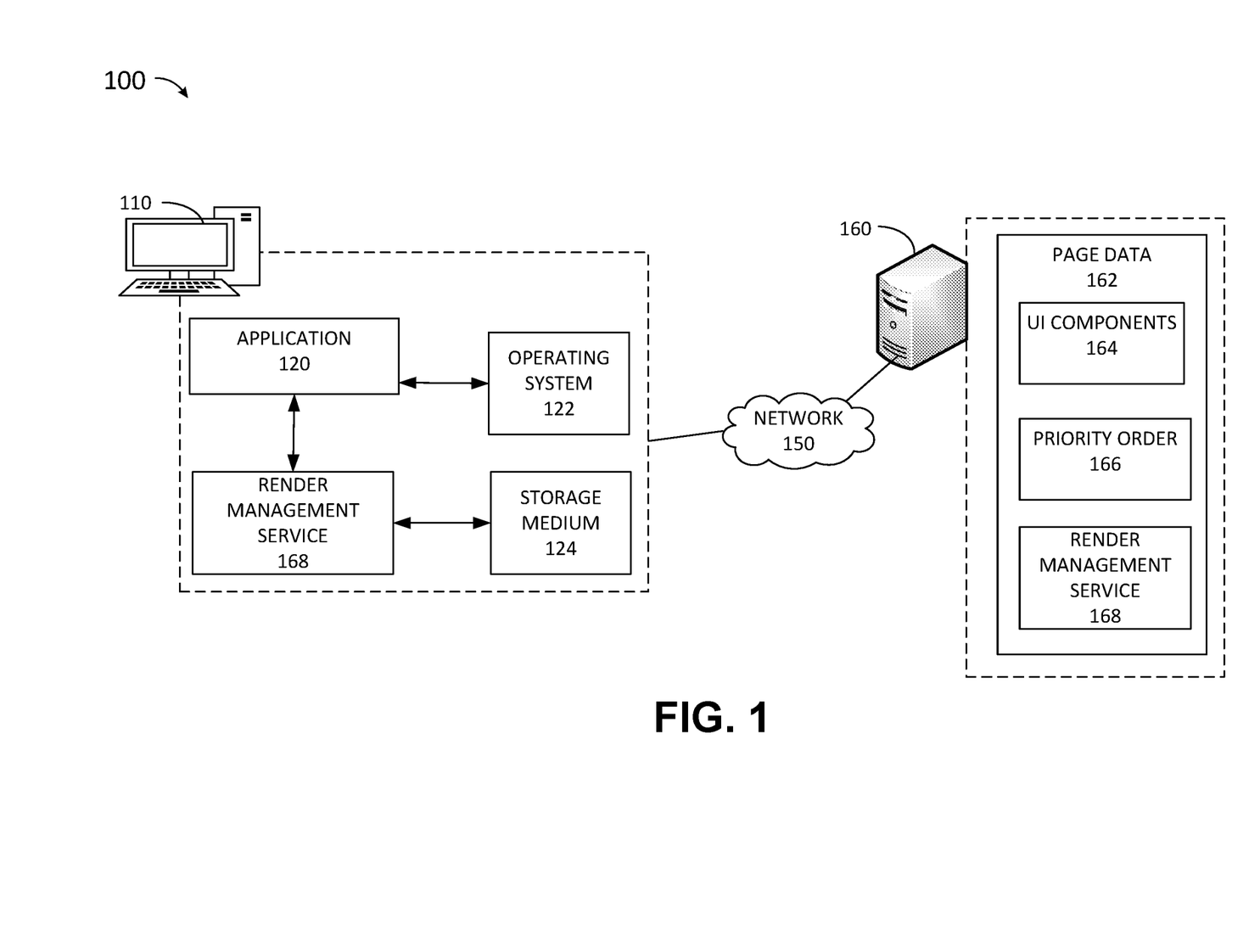
FIG. 1 depicts an example system upon which aspects of this disclosure may be implemented.

FIG. 1 illustrates an example system 100, upon which aspects of this disclosure may be implemented. The system 100 includes a client device 110 on which a software application such as application 120 is executed. The client device 110 may be a personal or handheld computing device having or being connected to input/output elements that enable a user to interact with the application 120 on the client device 110. Examples of suitable client devices 110 include but are not limited to personal computers, desktop computers, laptop computers, mobile telephones, smart phones, tablets, phablets, digital assistant devices, smart watches, wearable computers, gaming devices/computers, televisions, and the like. The internal hardware structure of a client device is discussed in greater detail in regard to FIGS. 5 and 6.

The application 120 is a software program executed on the client device 110 that configures the device 110 to be responsive to user input to allow a user to interact with the application 120. The application 120 includes a variety of elements that together form a program or suite of programs. In an example, the application 120 includes application code that, when run on the client device 110, executes the application 120 and displays a UI screen associated with the application 120. In some implementations, the application 120 is a browser application and the UI screen being loaded is a webpage. In such instances, the page data 162 is stored at a remote location such as the server 160 and the client device 110 retrieves the page data 162 via a network 150. It should be noted that the client device 110 can be a mobile telephone having an Android or iPhone Operation System and the application 120 may be an application running on the mobile telephone.

The network 150 may be a wired or wireless network(s) or a combination of wired and wireless networks that connect one or more elements of the system 100. The server 160 is a server that stores data for a page (e.g., a webpage) that is being accessed via the client device 110. The page data 162 includes UI components 164. The UI components 126 are components that are made available in each page (e.g., webpage or UI screen of the application 120). These components may include input controls, radio buttons, drop-down lists, list boxes, toggles, date fields, text fields, navigational components, scroll bar, tags, rich text components, images, and the like. Some of the UI components 164 require initiating a request to an external resource and/or are otherwise expensive to render (e.g., take significant time or processing resources to render). This results in an increased UI screen load time of components that are towards the bottom of the render tree, even if those components are more important or relevant to the page. To reduce the amount of time required to load important UI components on the UI screen, a priority order 166 and a render management service 168 may be included in the page data 162.

The priority order 166 includes an order of priority for one or more of the UI components 164. In some implementations, a priority order is included for each UI component 164 of the page data 162. The priority order provides an indication of priority (e.g., a priority list) for the UI components. As such, the priority order 166 may include a list of UI components and their associated priorities. Priority may be determined based on a priority number (e.g., priority number 1 through 5, with 5 having the highest priority for 5 UI components). The priority order may be based on the developers' preferred order for rendering the components. The order may be determined based on the order of importance or relevance of the components to an end user. In some implementations, multiple UI components may be given the same priority order (e.g., priority number 3). In such an instance, the components may be rendered based on the location in the render tree as well as the priority order, such that a component that appears first in the render tree and has the same priority number as a later appearing component is rendered first.

The render management service 168 is a service that may resides in the code for the UI screen (e.g., webpage or UI screen of the application). In some implementations, the webpage developer or application page developer includes the render management service in the HTML code or page code. Thus, once the page code is received by the client device 110, the render management service 168 is also received. In other implementations, the render management service 168 is a library that is retrieved separately from the code. For example, the application 120 may retrieve and utilize a single render management service 168 for multiple different pages. When the UI screen being rendered is a page of the application 120 itself (e.g., not a webpage or other page retrieved via a network), the render management service 168 is included in the UI screen code and as such may be part of the code for the application 120.

The render management service 168 functions as a service that keeps track of the components and their status. In some implementations, once components are loaded, they subscribe to the render management service 168. This may occur automatically and as part of the processing of the code. The render management service 168 then keeps track of the status of each component, the priority assigned to the component and the current rendering status of the component. This may be achieved by utilizing an internal data structure such as a render queue which keeps track of the components that are being rendered and/or are next in line to be rendered. The render queue utilizes the priority order 166 to determine the rendering order. The render management service 168 keeps track of component events by utilizing event listeners that detect events such as rendering of a component. Event listeners may be attached to the application 120 and/or activated via a JavaScript associated with the application 120. In some implementations, an event listener is a procedure in JavaScript that is designed to look for an event to occur and respond when the event occurs. The events may include loading and rendering.

Once a component is rendered, the event listener creates an event for transmission to the render management service 168. The render management service 168 then updates the render queue to indicate that the component has been rendered and provides the next component in the render queue for rendering. This ensures that components with higher priority are rendered first. Any asynchronous event that can run in parallel to the rendering operation is not blocked by this arrangement. Such asynchronous events are executed irrespective of the component in which they reside. Thus, while this process expedites the rending of high priority components, it does not interfere with other tasks associated with rendering the page.

The client device 110 includes an operating system 122 for managing the functions of the client device 110 and executing applications such as the application 120. When the application 120 is being mounted or when a new UI screen associated with the application 120 is being loaded, the operating system 122 executes the render management service 168, which may be provided as part of the application 120, stored in the storage medium 124 or included in code data 162 as retrieved by the application 120, to render the UI components 164. It should be noted that while the UI components 164 are displayed as being stored in the server 160, in some implementations, the UI components 164 and their corresponding priority order 166 are included in the code for the application 120 or are otherwise stored locally in the client device 110. Furthermore, the render queue, render management service 168, retrieved page data and the like may be stored in a storage medium, such as the storage medium 124 of the client device 110. For example, when the application 120 is a locally stored and operated application (the application 120 is not a browser), the page data 162 is stored locally on the client device 110.

Figure 2:
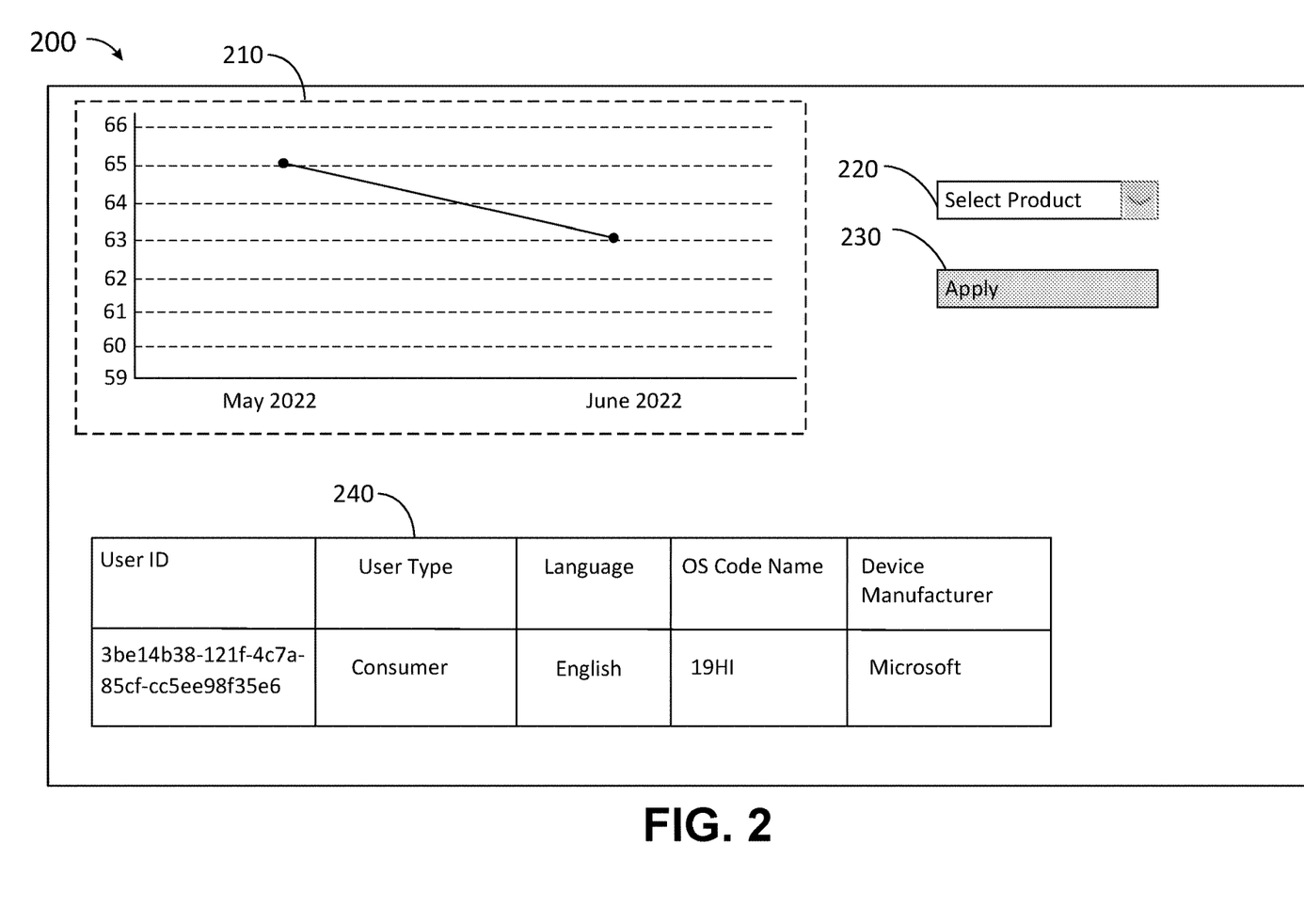
FIG. 2 depicts an example UI screen displaying multiple UI components.

FIG. 2 depicts an example UI screen 200 that displays multiple UI components. The UI screen 200 may be a UI screen of an application that includes one or more UI components or may be a webpage screen that includes multiple components. The UI screen 200 includes a graph component 210, multiple selectable menu components 220 and 230 and a table component 240. In previous page rendering mechanisms, the components 210, 220, 230 and 240 would be rendered in a top-down order such that component 210 would be rendered first, components 220 and 230 would be rendered second, and third, respectively, and component 240 would be rendered last. However, in the UI screen 200, the component 240 is the most important element and the element likely to be most useful for the user. Rendering the component 240 in a normal order would result in a delay in the display of the component that is most useful to the user. To avoid this, the technical solution presented herein makes use of priority orders and a render management service to indicate that the component 240 has the highest priority and thus enable rendering of the component 240 first. To avoid display of a disjointed UI screen, placeholders may be utilized in place of the components 210, 220 and 230, while the component 240 is being rendered. The placeholders may have the same style (e.g., same shape and/or width and height) as the components 210, 220 and 230. The placeholder components are replaced with the actual components when they are rendered. As a result, the highest priority component 240 is displayed more quickly. In some implementations, the time saved can be calculated by subtracting the amount of time required for rendering of placeholder from the render time of the actual component. In an example, this results in a time savings of 50 milliseconds for displaying the component 240.

Figure 3:
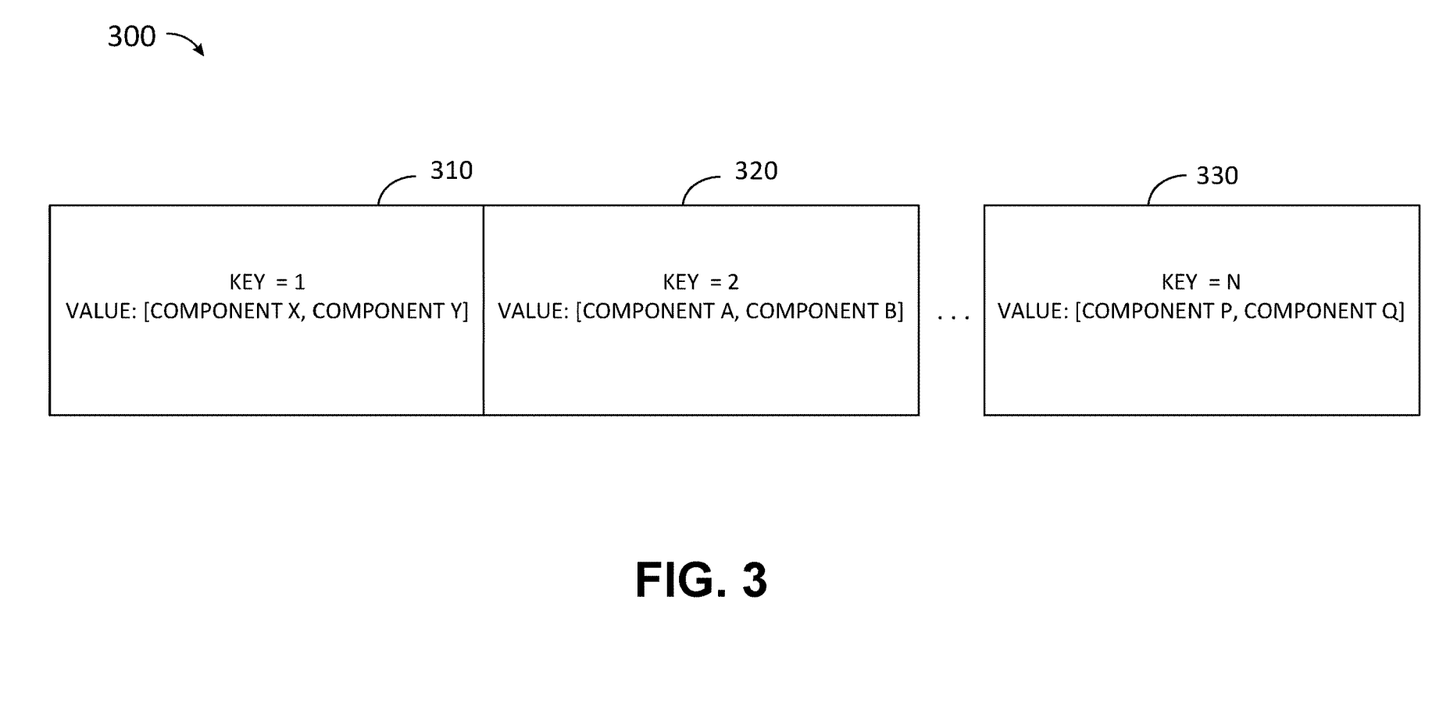
FIG. 3 depicts an example of a data structure used for keeping track of rendering order of UI components.

FIG. 3 depicts an example of a data structure 300 used for keeping track of rendering order of UI components. The data structure 300 may operate as a render queue for rendering components. In some implementations, the data structure is a Min Heap data structure. Data in the data structure may be stored in the following format:

Node: (1)→List<Component>
Node: (2)→List<Component>

In such a data structure, a node with the lowest value key (e.g., 1) corresponds with components having priority 1. This is depicted as item 310 in the data structure 300. As depicted, item 310 corresponds with components X and Y. This means that components X and Y of the UI screen have the highest priority. As such, item 310 is removed from the queue and components X and Y are rendered first. Once the components with priority 1 are rendered, an event is triggered which will move the queue to the next item, which is item 320. Item 320 corresponds with components of next priority from the queue. Those components are rendered next, and item 320 is removed from the queue to arrive at the next item in the queue. This will continue until the process arrives at item 330 which corresponds with components P and Q, which are the lowest priority components. In this manner, the data structure 300 enables rendering of the UI components based on a designated priority order. The following is an example software code for implementing a heap data structure that maintains priorities of three components, c1, c2 and c3:

```
const heap = new MinHeap( );
heap.insert({key: 1, value: 'c3'});
heap.insert({key: 2, value: 'c2'});
heap.insert({key: 3, value: 'c1'});
const initialState: any = {getMin: heap.getMin.bind(heap), remove: heap.remove.bind(heap)};
function App( ) {
    const [state, dispatch] = useReducer(reducer, initialState);
    return (
        < >
            <ComponentB priorityHeap={state} prioritykey="c2" updateHeap={dispatch}/>
            <div className="App">
                <ComponentA priorityHeap={state} priorityKey="c1" updateHeap={dispatch}/>
                <ComponentC priorityHeap={state} priorityKey="c3" updateHeap={dispatch}/>
            </div>
        </>
    );
}
```

The following is an example software code for implementing a render management service:

```
const runAfterFramePaint = (callback: any) => {
request AnimationFrame(( ) => {
    /**
    * MessageChannel is being used here as a generic mechanism to
Post a Task to the Task Queue.
    Furthermore, Tasks posted to the Task Queue via MessageChannel
are prioritized above most other Tasks.
    As a result, the browser is instructed to Run callback as a Task,
with high priority.
    */
    const messageChannel = new MessageChannel( );
    messageChannel.port1.onmessage = callback;
    messageChannel.port2.postMessage(undefined);
});
}
export const useMarkFramePaint = (callback: any, markName: string) => {
return useCallback((node: any) => {
    if (node) {
        // DOM node referenced has changed and exists
        runAfterFramePaint(( ) => {
            // Set a performance mark shortly after the frame has been
            produced.
            performance.mark(markName);
            callback( );
        });
    }
}, [callback, markName]);
}
export const useAfterRender = (callback: any, element: any) => {
    const requestRef = useRef<any>( );
    const checkElement = ( ) => {
        if (!element.current) {
            requestRef.current = requestAnimationFrame(checkElement);
            return;
        }
        callback( );
        cancelAnimationFrame(requestRef.current);
    }
    useEffect(( ) => {
        set Timeout(( ) => {
            requestRef.current = requestAnimationFrame(checkElement);
        })
        return ( ) => cancelAnimationFrame(requestRef.current);
    }, [ ]); // Make sure the effect runs only once
}
```

The following is an example software code for invoking the render management service on completion:

```
const markAsRendered = useCallback(( ) => {
    if (priorityHeap.getMin( )?. value === priorityKey) {
        updateHeap({ type: "remove" });
    }
}, [priorityHeap, priorityKey, updateHeap])
const paintRef = useMarkFramePaint(markAsRendered,
"ComponentA Rendered");
```

Figure 4:
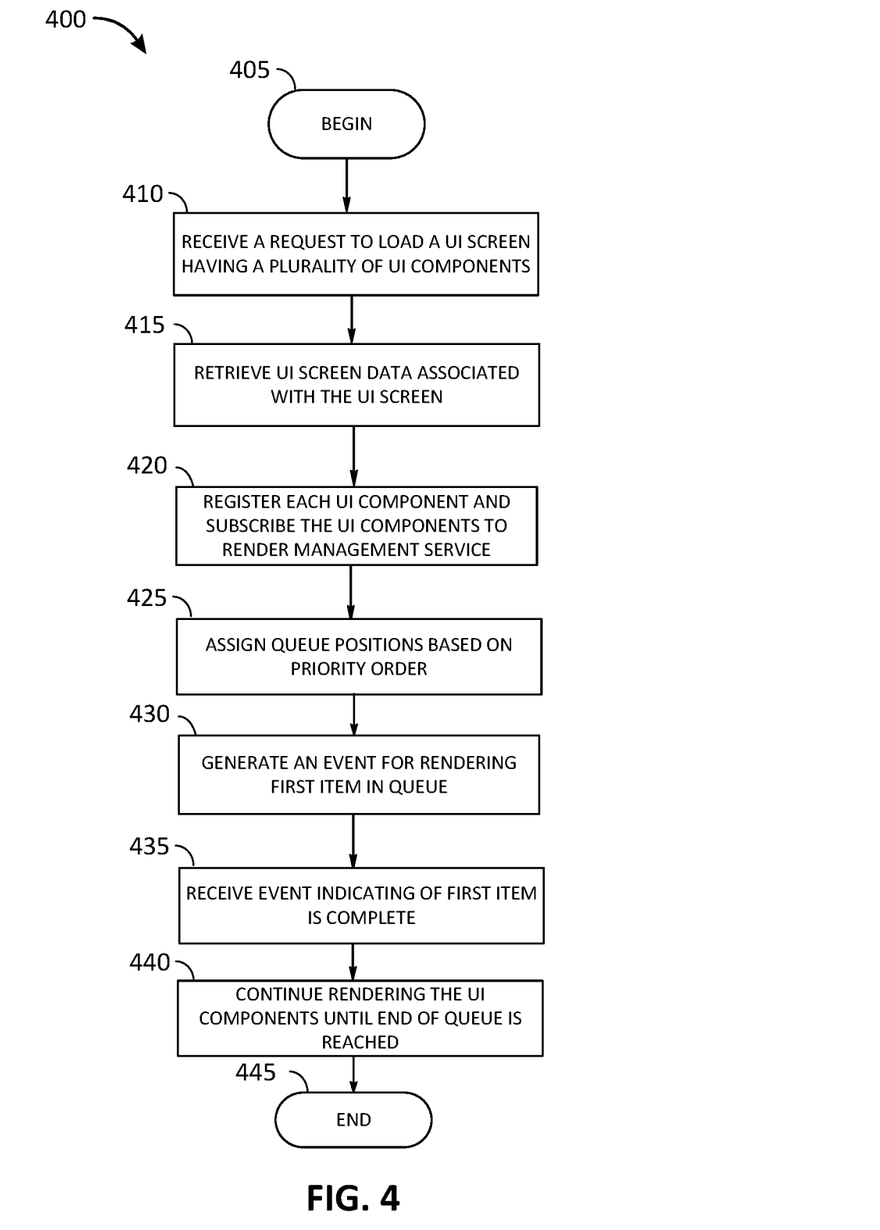
FIG. 4 is a flow diagram depicting an example method for rendering UI component based on a priority order.

FIG. 4 is a flow diagram depicting an example method for rendering UI components based on a priority order. One or more steps of the method 400 may be performed by an application such as the application 120 of FIG. 1 and/or by an operating system that operates in conjunction with the application. The method 400 begins, at 405, and proceeds to receive a request to load a UI screen, at 410. This may occur, for example, when an application is opened (e.g., a request to mount an application is received), when a new UI screen needs to be displayed for an active application or when a webpage is loaded (e.g., a request to access a webpage is received). The UI screen may be a UI screen of the application or a screen of a webpage.

After receiving the request, method 400 proceeds to retrieve the page data, at 415. Once the page data is retrieved, method 400 proceeds to register each component of the page data and subscribe the registered components to the render management service, at 420. Once the last component is registered and/or subscribed to the render management service and/or loaded in the render tree, a signal is transmitted to the render management service to begin processing the components. The priority order of the UI components is then examined to assign queue positions to each UI component based on the priority order, at 425. The queue positions are assigned based on the priority order and the position of the components in the render tree. For example, if two components in the UI components list have the same priority, but one of the components appears first in the render tree, the one appearing first in the render tree is given priority in the queue position.

Once the queue is generated, method 400 proceeds to generate an event for rendering the highest priority component, at 430. The highest priority component is then rendered according to the generated event. In some implementations, concurrent with or after the rendering of the highest priority component, placeholders are rendered for components that occur in the render tree before the highest priority component. In other implementations, before rendering of components begins, all components are rendered with placeholders. In this manner, the UI screen does not appear disjointed. After the highest priority component is rendered, an event is received that indicates rendering of the component is complete, at 435. Upon receipt of this event, method 400 proceeds to move to the next item in the render queue, at 440. If the next component in the render queue is being represented by a placeholder, the placeholder is replaced with the actual component. During the process of rendering components based on the render queue, other components continue to process tasks that can be done in parallel with the rendering operations. The process of rendering a component and moving to the next item in the queue is repeated until all items in the render queue are rendered, at which point, method 400 ends at 445.

Figure 5:
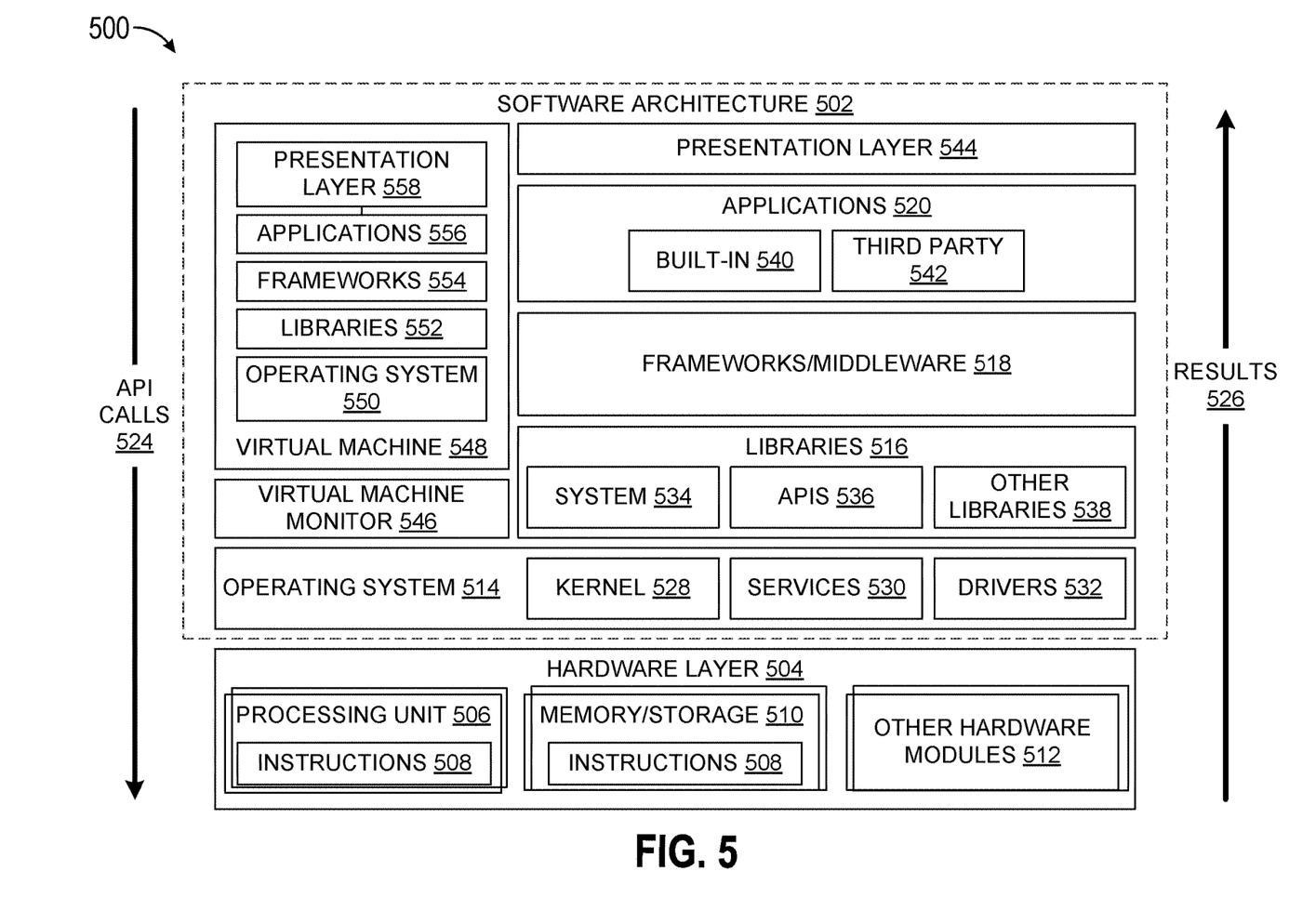
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 executes on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
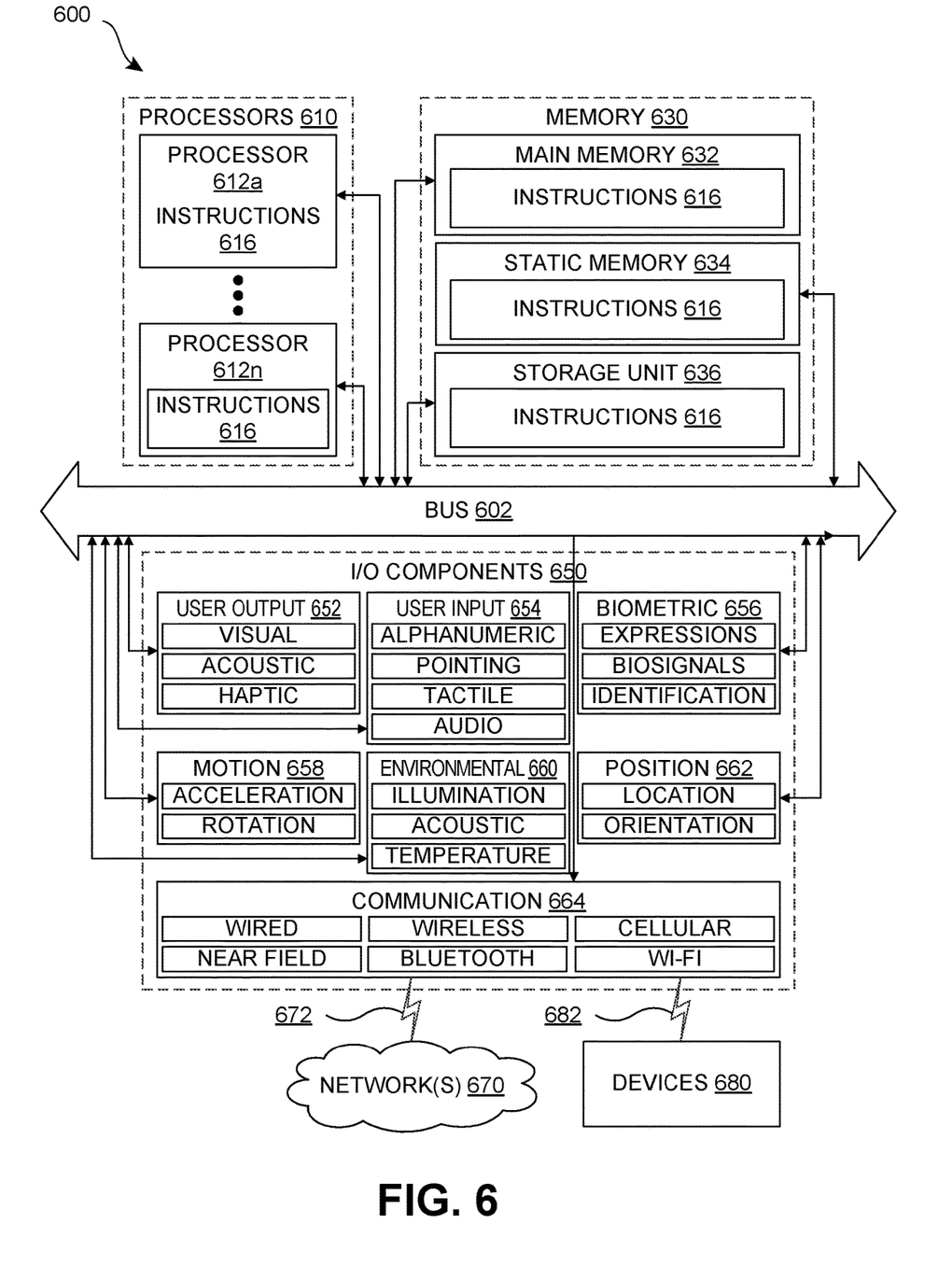
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a request to load a user interface (UI) screen, the UI screen including a plurality of components, each component being associated with a priority order;
creating a data structure for rendering the plurality of UI components in accordance with the priority order, the data structure including a list of the plurality of UI components in an order in which they should be rendered;
generating an event for rendering a first UI component in the data structure;
receiving an indication that the first UI component has been rendered in accordance with the event;
responsive to receiving the indication that the first UI component has been rendered, moving to a next UI component in the list to render; and
continuing with the rendering of the plurality of UI components in accordance with the order until all UI components in the list have been rendered.

Item 2. The data processing system of item 1, wherein the executable instructions, when executed by the processor, further cause the data processing system to perform functions of retrieving data associated with the UI screen, the data including the priority order.

Item 3. The data processing system of any of items 1 or 2, wherein the executable instructions, when executed by the processor, further cause the data processing system to perform functions of:
registering each of the plurality of UI components; and
subscribing each of the plurality of UI components to a render management service.

Item 4. The data processing system of item 3, wherein the render management service generates the data structure.

Item 5. The data processing system of any preceding item, wherein the render management service manages the rendering of the plurality of the UI components based on the priority order.

Item 6. The data processing system of any preceding item, wherein the executable instructions, when executed by the processor, further cause the data processing system to perform functions of:
generating a placeholder component for one or more components that appear before the first UI component in a render tree of the UI screen; and
displaying the placeholder component on the UI screen until the one or more components are rendered.

Item 7. The data processing system of item 6, wherein the placeholder component has at least one of a same shape or same style as the UI component for which it is created.

Item 8. A method for rendering a plurality of user interface (UI) components of a UI screen based on a priority order comprising:
  receiving a request to load the UI screen, the UI screen including the plurality of components, each component being associated with a priority order;
  creating a data structure for rendering the plurality of UI components in accordance with the priority order, the data structure including a list of the plurality of UI components in an order in which they should be rendered;
  generating an event for rendering a first UI component in the data structure;
  receiving an indication that the first UI component has been rendered;
  responsive to receiving the indication that the first UI component has been rendered, moving to a next UI component in the list to render; and
  continuing with the rendering of the UI components in accordance with the list until all UI components in the list have been rendered.

Item 9. The method of item 8, wherein the UI screen is a graphical user interface of an application.

Item 10. The method of any of items 8 or 9, wherein the UI screen is a webpage screen.

Item 11. The method of any of items 8-10, further comprising retrieving data associated with the UI screen, the data including the priority order.

Item 12. The method of any of items 8-11, further comprising:
  registering each of the plurality of UI components; and
  subscribing each of the plurality of UI components to a render management service.

Item 13. The method of item 12, wherein the render management service generates the data structure.

Item 14. The method of any of items 8-13, wherein the data structure comprises a render queue.

Item 15. The method of any of items 8-14, wherein the data structure is a Min Heap data structure.

Item 16. A non-transitory computer readable medium on which are stored instructions that, when executed, cause a programmable device to perform functions of:
  receiving a request to load a user interface (UI) screen, the UI screen including a plurality of components, each component being associated with a priority order;
  assigning queue positions to each component of the plurality of components in a render queue for rendering the plurality of components, the render positions being based at least in part on the priority order;
  creating a data structure for rendering the plurality of UI components in accordance with the render queue, the data structure including a list of the plurality of UI components in an order in which they appear in the render queue;
  generating an event for rendering a first UI component in the data structure;
  receiving an indication that the first UI component has been rendered;
  responsive to receiving the indication that the first UI component has been rendered, moving to a next UI component in the list to render; and
  continuing with the rendering of the UI components in accordance with the list until all UI components in the list have been rendered.

Item 17. The non-transitory computer readable medium of item 16, wherein the instructions when executed further cause the programmable device to perform functions of retrieving data associated with the UI screen, the data including the priority order.

Item 18. The non-transitory computer readable medium of any of items 16 or 17, wherein the instructions when executed further cause the programmable device to perform functions of:
  registering each of the plurality of UI components; and
  subscribing each of the plurality of UI components to a render management service.

Item 19. The non-transitory computer readable medium of any of items 16-18, wherein the instructions when executed further cause the programmable device to perform functions of:
  generating a placeholder component for one or more components that appear before the first UI component in a render tree of the UI screen; and
  displaying the placeholder component on the UI screen until the one or more components are rendered.

Item 20. The non-transitory computer readable medium of any of items 16-19, wherein the placeholder component has at least one of a same shape or same style as the UI component for which it is created.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions.

The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a request to load a user interface (UI) screen, the UI screen including a plurality of components;
parsing retrieved code for the UI screen, the code indicating a render tree for the UI screen including the plurality of components, wherein, independent of an order of the plurality of components in the render tree, each component is associated with a priority order based on an importance of the component, the priority order being predetermined during coding of the UI screen and the priority order for each UI component being included in the code for the UI screen;
creating a data structure for rendering the plurality of UI components in accordance with a rendering order determined by the priority order that is independent of the order of the components in the render tree, the data structure including a list of the plurality of UI components in the rendering order;
generating an event to a render management service for rendering a first UI component in the rendering order of the data structure;
receiving, at the render management service, an indication that the first UI component has been rendered in accordance with the event;
responsive to receiving the indication that the first UI component has been rendered, moving, via the render management service, to a next UI component in the list to render; and
continuing, via the render management service, with rendering of the plurality of UI components in accordance with the rendering order until all UI components in the list have been rendered.

2. The data processing system of claim 1, wherein the executable instructions, when executed by the processor, further cause the data processing system to perform functions of retrieving data associated with the UI screen, the data including the priority order.

3. The data processing system of claim 1, wherein the executable instructions, when executed by the processor, further cause the data processing system to perform functions of:
registering each of the plurality of UI components; and
subscribing each of the plurality of UI components to a render management service.

4. The data processing system of claim 3, wherein the render management service generates the data structure.

5. The data processing system of claim 3, wherein the render management service manages the rendering of the plurality of the UI components based on the rendering order.

6. The data processing system of claim 1, wherein the executable instructions, when executed by the processor, further cause the data processing system to perform functions of:
generating a placeholder component for one or more components that appear before the first UI component in a render tree of the UI screen; and
displaying the placeholder component on the UI screen until the one or more components are rendered.

7. The data processing system of claim 6, wherein the placeholder component has at least one of a same shape or same style as the UI component for which it is created.

8. A method for rendering a plurality of user interface (UI) components of a UI screen based on a priority order comprising:
receiving a request to load the UI screen, the UI screen including a plurality of components;
parsing retrieved code for the UI screen, the code indicating a render tree for the UI screen including the plurality of components, wherein, independent of an order of the plurality of components in the render tree, each component is associated with a priority order based on an importance of the component, the priority order being predetermined during coding of the UI screen and the priority order for each UI component being included in the code for the UI screen;
creating a data structure for rendering the plurality of UI components in accordance with a rendering order determined by the priority order that is independent of the order of the components in the render tree, the data structure including a list of the plurality of UI components in the rendering order;
generating an event to a render management service for rendering a first UI component in the rendering order of the data structure;
receiving, at the render management service, an indication that the first UI component has been rendered in accordance with the event;
responsive to receiving the indication that the first UI component has been rendered, moving, via the render management service, to a next UI component in the list to render; and
continuing, via the render management service, with rendering of the plurality of UI components in accordance with the rendering order until all UI components in the list have been rendered.

9. The method of claim 8, wherein the UI screen is a graphical user interface of an application.

10. The method of claim 8, wherein the UI screen is a webpage screen.

11. The method of claim 8, further comprising retrieving data associated with the UI screen, the data including the priority order.

12. The method of claim 8, further comprising:
registering each of the plurality of UI components; and
subscribing each of the plurality of UI components to a render management service.

13. The method of claim 12, wherein the render management service generates the data structure.

14. The method of claim 8, wherein the data structure comprises a render queue.

15. The method of claim 8, wherein the data structure is a Min Heap data structure.

16. A non-transitory computer readable medium on which are stored instructions that, when executed, cause a programmable device to perform functions of:
receiving a request to load a user interface (UI) screen, the UI screen including a plurality of components;
parsing retrieved code for the UI screen, the code indicating a render tree for the UI screen including the plurality of components, wherein, independent of an order of the plurality of components in the render tree, each component is associated with a priority order based on an importance of the component, the priority order being predetermined during coding of the UI screen and the priority order for each UI component being included in the code for the UI screen;
creating a data structure for rendering the plurality of UI components in accordance with a rendering order determined by the priority order that is independent of the order of the components in the render tree, the data structure including a list of the plurality of UI components in the rendering order;
generating an event to a render management service for rendering a first UI component in the rendering order of the data structure;
receiving, at the render management service, an indication that the first UI component has been rendered in accordance with the event;
responsive to receiving the indication that the first UI component has been rendered, moving, via the render management service, to a next UI component in the list to render; and
continuing, via the render management service, with rendering of the plurality of UI components in accordance with the rendering order until all UI components in the list have been rendered.

17. The non-transitory computer readable medium of claim 16, wherein the instructions when executed further cause the programmable device to perform functions of retrieving data associated with the UI screen, the data including the priority order.

18. The non-transitory computer readable medium of claim 16, wherein the instructions when executed further cause the programmable device to perform functions of
registering each of the plurality of UI components; and
subscribing each of the plurality of UI components to a render management service.

19. The non-transitory computer readable medium of claim 16, wherein the instructions when executed further cause the programmable device to perform functions of:
generating a placeholder component for one or more components that appear before the first UI component in a render tree of the UI screen; and
displaying the placeholder component on the UI screen until the one or more components are rendered.

20. The non-transitory computer readable medium of claim 19, wherein the placeholder component has at least one of a same shape or same style as the UI component for which it is created.

* * * * *